United States Patent
Bartell

(10) Patent No.: US 9,032,662 B2
(45) Date of Patent: *May 19, 2015

(54) FISH HOOK WITH MULTIPLE CONVEX FACETS

(75) Inventor: Joseph E. Bartell, Littleton, CO (US)

(73) Assignee: WRIGHT & MCGILL CO., Denver, CO (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/545,793

(22) Filed: Jul. 10, 2012

(65) Prior Publication Data

US 2012/0291334 A1 Nov. 22, 2012

Related U.S. Application Data

(63) Continuation-in-part of application No. 13/109,717, filed on May 17, 2011, now Pat. No. 8,707,613, and a continuation-in-part of application No. PCT/US2012/037018, filed on May 9, 2012.

(51) Int. Cl.
A01K 83/00 (2006.01)
A01K 83/04 (2006.01)

(52) U.S. Cl.
CPC ..................................... *A01K 83/04* (2013.01)

(58) Field of Classification Search
CPC ....... A01K 97/18; A01K 97/24; A01K 81/04; A01K 83/00; A01K 91/06; B21F 45/12; A61B 10/0233; B24B 19/16; B24D 15/06
USPC ......... 43/6, 43.16, 44.82, 44.83, 43; 452/187, 452/189; 606/184
See application file for complete search history.

(56) References Cited

U.S. PATENT DOCUMENTS

| | | | |
|---|---|---|---|
| 627,179 | A | 6/1899 | Dreese |
| 842,594 | A | 1/1907 | Vleck |
| 1,072,172 | A | 9/1913 | Schell |
| 1,430,626 | A | 10/1922 | Christensen |
| 1,513,400 | A | 10/1924 | Koski |
| 1,604,031 | A | 10/1926 | Ferguson |
| 2,164,807 | A | 7/1939 | Evans |
| 2,514,527 | A | 7/1950 | Verhota |
| 2,539,735 | A | 1/1951 | Forsyth |

(Continued)

FOREIGN PATENT DOCUMENTS

| | | |
|---|---|---|
| GB | 1204223 | 9/1970 |
| GB | 2067882 A * | 8/1981 |

(Continued)

OTHER PUBLICATIONS

Official Action for Chinese Patent Application No. 201220215799.2, mailed on Sep. 18, 2012, 3 pages (with partial English translation).

(Continued)

*Primary Examiner* — Rob Swiatek
*Assistant Examiner* — George Andonyan
(74) *Attorney, Agent, or Firm* — Sheridan Ross P.C.

(57) ABSTRACT

A fish hook with multiple convex facets is provided. Each facet may have a length that is some multiple of the diameter of the hook body. In addition, each convex facet has a radius of curvature that is some multiple of the diameter of the wire. Each facet may alternatively be formed from first and second convex surfaces, having first and second curvatures.

16 Claims, 5 Drawing Sheets

(56) References Cited

U.S. PATENT DOCUMENTS

| | | |
|---|---|---|
| 2,823,485 A | 2/1958 | Traumüller |
| 3,505,756 A * | 4/1970 | Bowden ................. 43/43.16 |
| 3,604,143 A | 9/1971 | Sauers |
| 4,126,957 A | 11/1978 | Randall |
| D276,360 S | 11/1984 | Sitton |
| D288,467 S | 2/1987 | Sitton |
| 4,723,372 A | 2/1988 | Moser |
| 4,802,300 A | 2/1989 | Fujii et al. |
| 4,819,366 A | 4/1989 | Manno |
| 4,901,467 A | 2/1990 | Stolpe |
| 4,905,402 A | 3/1990 | Clark |
| 4,905,403 A | 3/1990 | Manno |
| 5,165,197 A | 11/1992 | Sitton |
| 5,179,809 A | 1/1993 | Schroeder |
| 5,214,875 A | 6/1993 | Hoben et al. |
| 5,297,356 A | 3/1994 | Wickham |
| 5,526,603 A | 6/1996 | Fujii et al. |
| 5,618,297 A * | 4/1997 | Hart et al. .................. 606/185 |
| 5,624,459 A | 4/1997 | Kortenbach et al. |
| 5,685,108 A | 11/1997 | Lepage et al. |
| 6,053,927 A | 4/2000 | Hamas |
| 6,334,273 B2 | 1/2002 | Turner et al. |
| 6,910,297 B1 | 6/2005 | Sitton |
| 7,159,357 B2 | 1/2007 | Sitton |
| D541,900 S | 5/2007 | Scott |
| D594,526 S | 6/2009 | Ferguson et al. |
| D594,527 S | 6/2009 | Ferguson et al. |
| D594,528 S | 6/2009 | Ferguson et al. |
| 7,571,564 B2 | 8/2009 | Sullivan |
| 2004/0195718 A1 | 10/2004 | Obrachta et al. |
| 2005/0076557 A1 | 4/2005 | Fujii |
| 2005/0241214 A1 | 11/2005 | Ferguson |
| 2010/0257711 A1 | 10/2010 | Ferguson et al. |

FOREIGN PATENT DOCUMENTS

| | | |
|---|---|---|
| JP | 2005-224236 | 8/2005 |
| JP | 2005-348668 | 12/2005 |
| NO | 39388 | 7/1924 |
| WO | WO 97/04648 | 2/1997 |
| WO | WO 97/14302 | 4/1997 |

OTHER PUBLICATIONS

International Search Report for International Patent Application No. PCT/US12/37018, mailed Jul. 16, 2012, 3 pages.
Written Opinion for International Patent Application No. PCT/US12/37018, mailed Jul. 16, 2012, 4 pages.
U.S. Appl. No. 13/109,717, filed May 17, 2011, Bartell.
Official Action for U.S. Appl. No. 13/109,717 mailed May 1, 2013, 16 pages.
Official Action for U.S. Appl. No. 13/109,717 mailed Mar. 14, 2013, 11 pages.
International Preliminary Report on Patentability for International (PCT) Patent Application No. PCT/US2012/037018, mailed Nov. 28, 2013, 6 pages.
Official Action for U.S. Appl. No. 13/109,717 mailed Oct. 2, 2013, 15 pages.
Notice of Allowance for U.S. Appl. No. 13/109,717 mailed Dec. 16, 2013, 13 pages.

* cited by examiner

FISH HOOK WITH MULTIPLE CONVEX FACETS

CROSS-REFERENCE TO RELATED APPLICATIONS

The present application is a continuation-in-part of U.S. patent application Ser. No. 13/109,717, filed May 17, 2011. The present application is also a continuation-in-part of PCT Application Serial No. PCT/US12/37018, filed May 9, 2012, which designated the United States. The entire disclosures of each of these patent applications are incorporated by reference herein in their entirety.

FIELD

The present invention is directed to a fish hook with multiple convex facets.

BACKGROUND

Line and hook fishing is a popular and efficient means of catching fish. Typically, a fish hook is formed from round wire that has been bent into a U or hook shape, with a point at a first end, and an eye at a second end. In a typical fish hook, the point is formed into a conical or "needle point" shape. In order for a conical point to penetrate the fish's mouth, the membrane comprising the lining of the mouth must be stretched over the point before the membrane is punctured. Moreover, the point has to continue to expand the membrane to penetrate up to and beyond the barb, which can require a significant amount of energy.

In order to reduce the force required to penetrate the fish's mouth, faceted points have been developed. A faceted point provides cutting edges that allow the point to more efficiently penetrate the fish's mouth. In particular, the amount of energy required for a faceted point to penetrate a membrane can be much less than is required for a conical point of similar size to penetrate that membrane. However, faceted points typically are weak, and therefore prone to bending or breaking. This is because the faceted surfaces typically acquire a concave shape during the grinding process used to form the facets, leaving little material at or towards the apex of the point. Therefore, the strength and durability of the resulting point may be less than desired.

SUMMARY

The present invention is directed to solving these and other problems and disadvantages of the prior art. In accordance with embodiments of the present invention, a fish hook with multiple convex facets is provided. As a result, at a selected distance from the tip of the point, the cross-section of a point as disclosed herein has more material, and therefore is stronger, than an otherwise similar point with a typical concave facet shape. Accordingly, a strong point that provides multiple cutting edges is provided.

A fish hook as disclosed herein includes a point with two or more convex facets. For example, the point of a fish hook in accordance with embodiments of the present invention can include three convex facets. In accordance with further embodiments, the point can include three or more convex facets. The facets can each have the same or different dimensions. In accordance with further embodiments, the facets can include double radius facets, where each facet follows a first radius over a first portion or distance, and a second radius over a second portion or distance.

In accordance with embodiments of the present invention, the facets have a length that is from about 2 times to about 6 times the diameter of the wire on which the multiple convex facet point is formed. In accordance with further embodiments, the curve of the convex facets follows a radius that is from about 15 times to about 150 times the diameter of the wire on which the multiple convex facets of the point are formed. In accordance with other embodiments, the ratio of the facet length to the wire diameter is about 4.5 to 1, and the ratio of the radius of curvature of the convex facets to the wire diameter is about 30 to 1, 120 to 1, 140 to 1, or 150 to 1.

Additional features and advantages of embodiments of the present invention will become more readily apparent from the following description, particularly when taken together with the accompanying drawings.

DETAILED DESCRIPTION

Figure 1:
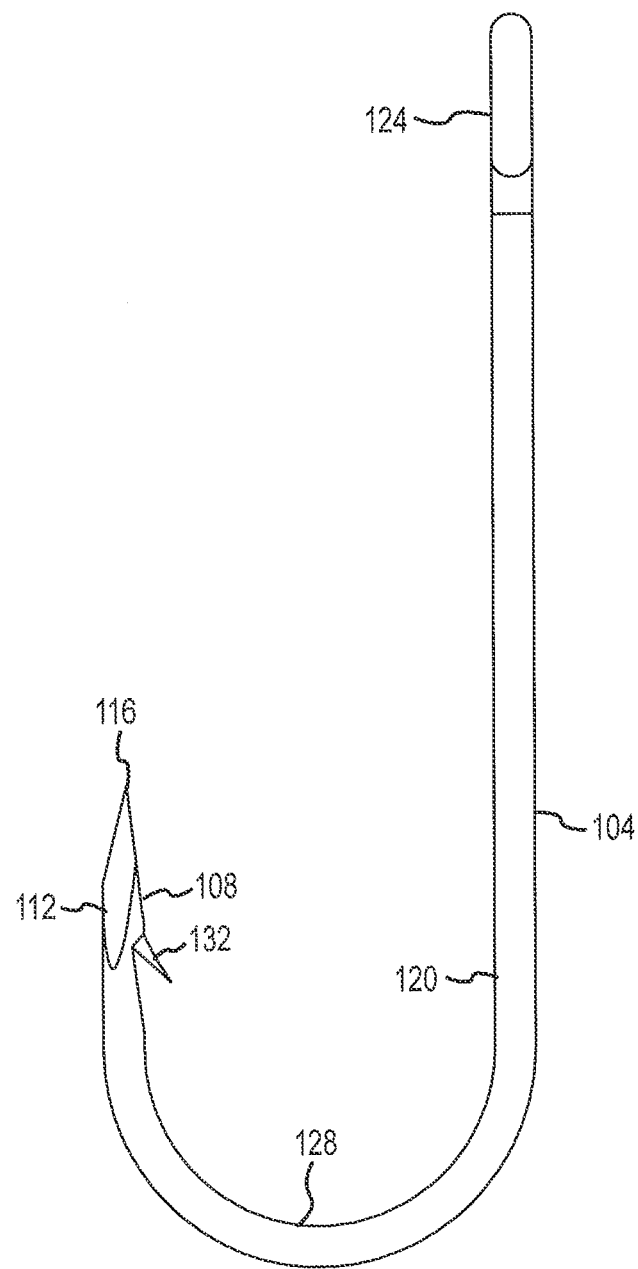
FIG. 1 is a side view of a fish hook with multiple convex facets in accordance with embodiments of the present invention.

FIG. 1 illustrates a fish hook 104 in accordance with embodiments of the present invention. The fish hook 104 includes a point portion 108 formed from multiple facets 112. More particularly, the point portion 108 in accordance with embodiments of the present invention is formed from multiple convex facets 112. The tip 116 of the point portion 108 is located at a first end of a wire blank or body 120 from which the fish hook 104 is formed. In the finished form illustrated in FIG. 1, the fish hook 104 typically includes an eye 124 formed at a second end of the wire body 120 with a bend 128 formed between the first and second ends, creating a hook shape. The fish hook 104 can also include a barb 132 adjacent the point portion 108.

Figure 2:
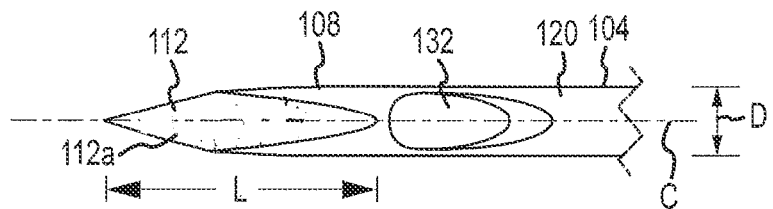
FIG. 2 is a top plan view of a point portion of a fish hook with multiple convex facets in accordance with embodiments of the present invention.

FIG. 2 is a top plan view of the point portion 108 and barb 132 of a fish hook 104 in accordance with embodiments of the present invention. In this embodiment, which features three convex facets 112, a first convex facet 112a is shown. In accordance with embodiments of the present invention, the facet 112 has a length L that is from about 2 times to about 6 times the diameter D of the wire body 120. In accordance with still other embodiments, the length L of the facets 112 is about 4.5 times the diameter D of the body 120. As used herein, a dimension or parameter is "about" another dimension or parameter if it is within about 10% of the stated dimension or parameter. In accordance with still other embodiments, the length L of each facet 112 is 4.5 times the diameter D of the wire body 120.

Figure 3:
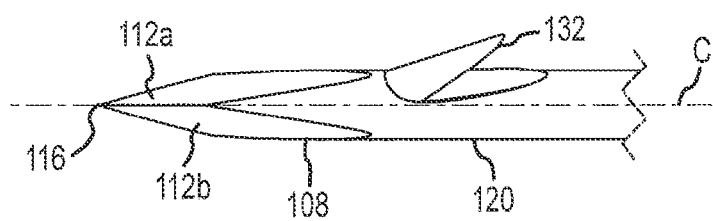
FIG. 3 is a view taken along a line corresponding to the intersection between two adjacent facets of a fish hook with multiple convex facets in accordance with embodiments of the present invention.

FIG. 3 illustrates a view of the point portion 108 and barb 132 of the fish hook 104 shown in FIGS. 1-2, with the point portion 108 of the fish hook 104 rotated about 60° about a center axis C of the point portion 108 as compared to the view shown in FIG. 2. More particularly, the intersection between two convex facets 112a and 112b is shown. In addition, the point portion 108, including areas at and near the tip 116, can be seen to benefit from reinforcement as a result of the convex facets 112a and 112b provided by the present invention. That is, as compared to a point having facets with a flat or concave surface, a point portion 108 with convex facets 112 as described herein has a larger cross section for a given wire diameter, facet length, and distance from the tip.

Figure 4A:
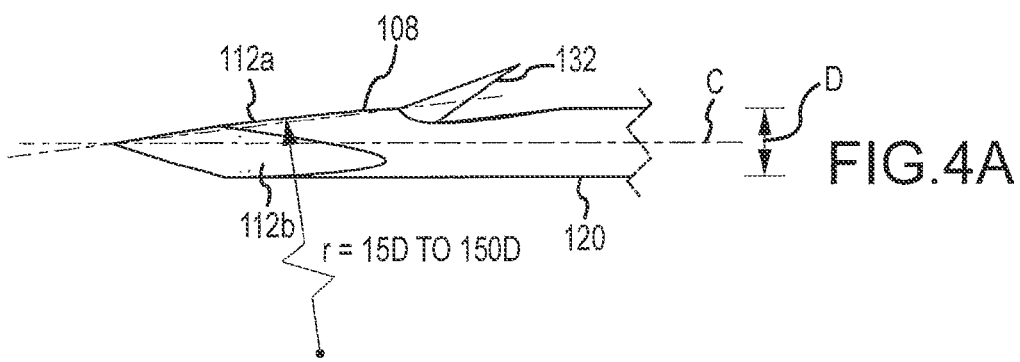
FIG. 4A is a side view of a point portion of a fish hook with multiple convex facets in accordance with embodiments of the present invention.
Figure 4B:
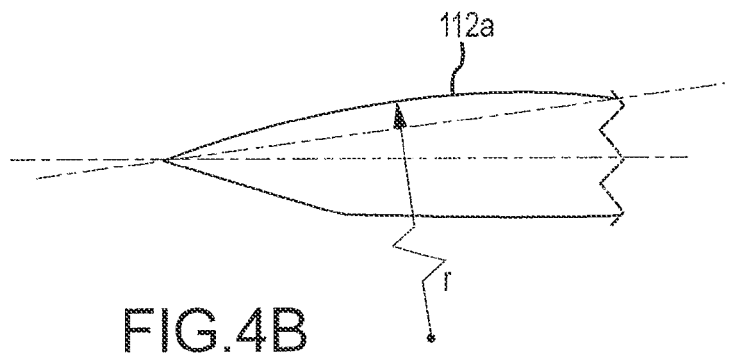
FIG. 4B is a longitudinal cross-section of the point portion of the fish hook with multiple convex facets shown in FIG. 4A.

FIG. 4A illustrates the point portion 108 and barb 132 of the fish hook 104 shown in FIGS. 1-3, in side elevation. Accordingly, the view in FIG. 4A is with the point portion 108 of fish hook 104 rotated about 90° about the center axis C of the point portion 108 as compared to the view shown in FIG. 2, and by about 30° as compared to the view shown in FIG. 3. FIG. 4B is a longitudinal cross-section of the point portion 108 shown in FIG. 4A. In FIGS. 4A and 4B, the convex surface of the first facet 112a is best illustrated. As shown in those figures, the first facet 112a is convex, and therefore curves outwardly from the dotted line drawn between the tip of the point and starting point of the facet, where the starting point of the facet is an end of the facet opposite the point. Although depicted with a distinct peak or break for purposes of clarity and to emphasize that the facets 112 are convex (i.e., they bulge outwardly), it should be appreciated that embodiments of the present disclosure can have facets 112 that each have a surface that follows a smooth curve having a relatively large radius (e.g., as shown in FIG. 1). In accordance with embodiments of the present invention, the radius of curvaturer of each of the convex facets 112 is from about 15 times to about 150 times the diameter D of the wire body 120. In accordance with still other embodiments, the radius of curvature of each of the facets 112 is about 140 times the diameter D of the body portion 120. In accordance with still other embodiments, the radius of curvature of each facet 112 is about 120 times the diameter D of the body portion 120. As used herein, "about" means within ±5% of the stated amount.

Figure 5:
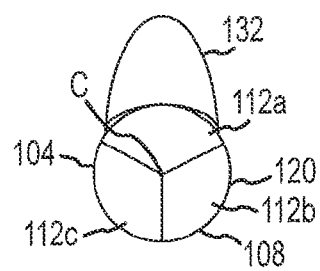
FIG. 5 is an end on view of a point portion of a fish hook with multiple convex facets in accordance with embodiments of the present invention.

FIG. 5 is an end on view, taken along the center axis C of the point portion 108 of the fish hook 104, of the point portion 108 and barb 132 of the fish hook illustrated in FIGS. 1-4. In particular, FIG. 5 shows each of the three facets 112a, 112b and 112c that comprise the point portion 108 of this three faceted point embodiment.

Figure 6:
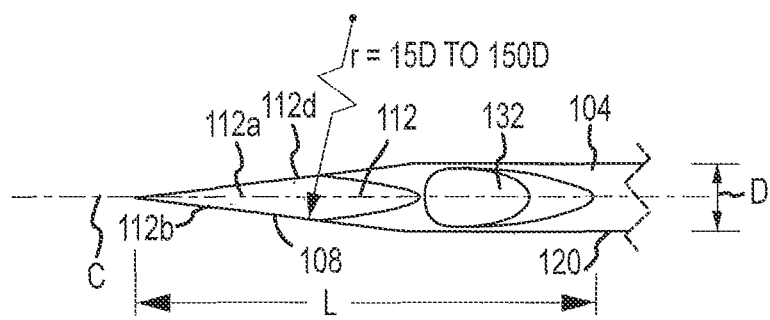
FIG. 6 is a top plan view of a point portion of a fish hook with multiple convex facets in accordance with other embodiments of the present invention.

FIG. 6 is a top plan view of the point portion 108 of a fish hook 104 in accordance with other embodiments of the present invention. More particularly, FIG. 6 illustrates a point 108 formed from four facets 112. In the view shown in FIG. 6, the radius of curvature r of the second 112b and fourth 112d facets can be seen. The facet 112 length, wire body 120 diameter ratios, and the facet 112 radius of curvature to wire body 120 diameter ratios can be within the same or similar ranges as other described embodiments.

Figure 7:
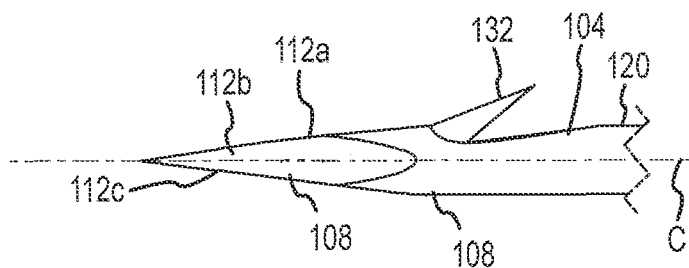
FIG. 7 is a side view of a point portion of a fish hook with multiple convex facets in accordance with other embodiments of the present invention.

FIG. 7 is a side view of the point portion 108 of a fish hook 104 of the embodiment illustrated in FIG. 6. The view in FIG. 7 is with the point portion 108 of the fish hook 104 rotated by about 90° about the center axis C of the point portion 108 as compared to the view shown in FIG. 6. FIG. 7 shows the convex curvature of the first 112a and third 112c facets of the point portion 108 of the fish hook 104. The radius of curvature of the first 112a and third 112c facets can be described by a radius of curvature that is within the same or similar ratio ranges to the wire diameter as other described embodiments.

Figure 8:
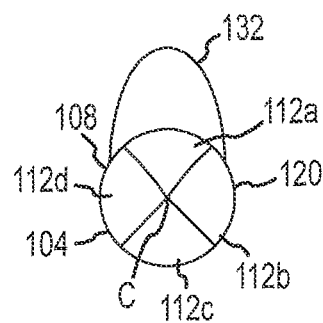
FIG. 8 is an end on view of a point portion of a fish hook with multiple facets in accordance with other embodiments of the present invention.

FIG. 8 is an end on view, taken along the center axis C of the point portion 108 of the fish hook 104, of the point portion 108 and barb 132 of the fish hook 104 illustrated in FIGS. 6 and 7. In FIG. 8, each of the facets 112a-112d can be seen.

Figure 9:
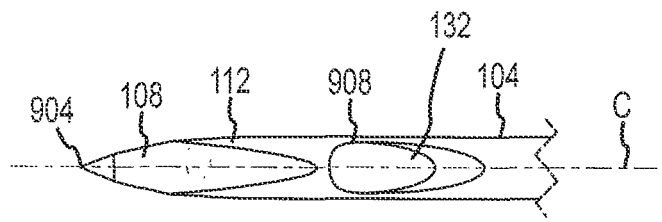
FIG. 9 is a top plan view of a point portion of a fish hook with multiple convex facets in accordance with other embodiments of the present invention.
Figure 10:
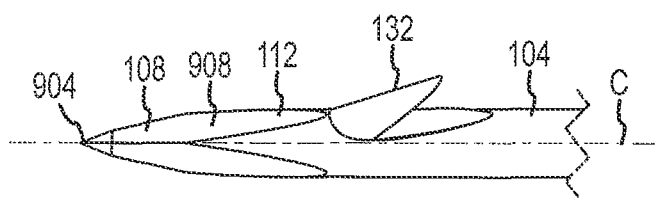
FIG. 10 is a view taken along a line corresponding to the intersection between two adjacent facets of a fish hook with multiple convex facets in accordance with other embodiments of the present invention.
Figure 11A:
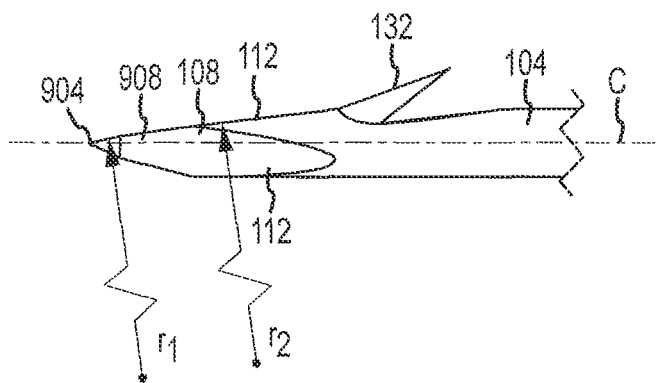
FIG. 11A is a side view of a point portion of a fish hook with multiple convex facets in accordance with other embodiments of the present invention.
Figure 11B:
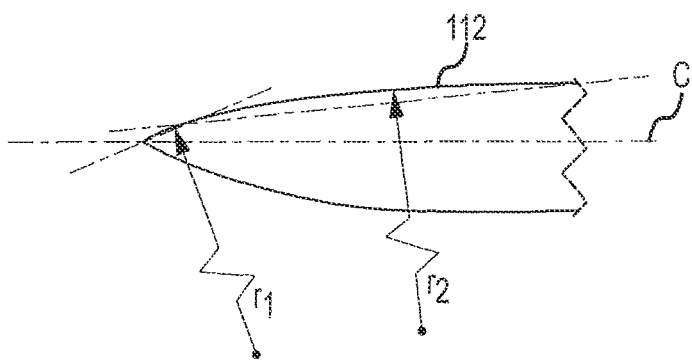
FIG. 11B is a longitudinal cross-section of the point portion of the fish hook with multiple convex facets shown in FIG. 11A.
Figure 12:
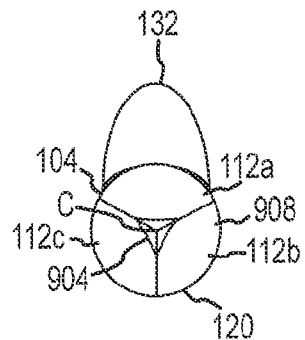
FIG. 12 is an end on view of the point portion of a fish hook with multiple convex facets in accordance with other embodiments of the present invention.

FIG. 9 is a top plan view of the point portion 108 and barb 132 of a fish hook 104 in accordance with still other embodiments of the present invention. In this embodiment, the facets 112 comprise dual radius facets. In particular, a first or tip portion 904 of each facet 112 follows a first radius of curvature, while a second portion 908 of each facet 112 follows a second radius of curvature. FIG. 10 illustrates the point portion 108 and barb 132 of the fish hook 104 of FIG. 9, with the point portion 108 of the fish hook 104 rotated about 60° about a center axis of the point portion 108 as compared to the view shown in FIG. 9. FIG. 11A illustrates the point portion 108 and barb 132 of the fish hook shown in FIGS. 9 and 10, with the point portion 108 of the fish hook 104 rotated by about 90° about a center axis of the point portion 108 as compared to the view shown in FIG. 9, and by about 30° as compared to the view shown in FIG. 10. FIG. 11B is a longitudinal cross-section of the point portion 108 shown in FIG. 11A. FIG. 12 is an end on view, taken along the center axis C of the point portion 108 of the fish hook 104, of the point portion 108 and barb 132 of the fish hook illustrated in FIGS. 9-11B. In particular, FIG. 12 shows each of the three facets 112a, 112b, and 112c that comprise the point portion 108 of this three faceted point embodiment. Moreover, FIG. 12 shows the first 904 and second 908 portions of each of the facets 112. In accordance with embodiments featuring dual radius facets, and as shown in FIGS. 11A and 11B, the first portion 904 of each facet 112 can feature or follow a radius of curvature that is different than the radius of curvature of the second portion 908. As an example, the first portion 904 of each facet 112 can feature a radius of curvature ($r_1$) that is about 30 times the diameter D of the wire body 120, while the radius of curvature ($r_2$) of the second portion 908 can be from about 20 times to about 150 times the diameter D of the wire body 120. As yet another example, one portion 904 or 908 can have a radius of curvature that is infinite (i.e., one portion 904 or 908 can be flat).

Figure 13:
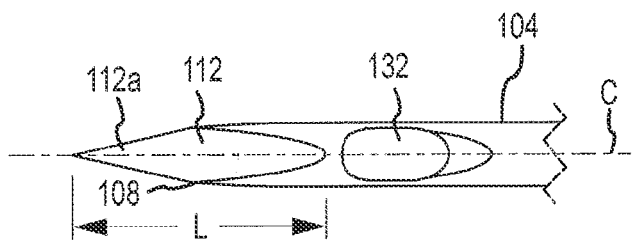
FIG. 13 is a top plan view of a point portion of a fish hook with multiple convex facets in accordance with other embodiments of the present invention.
Figure 14:
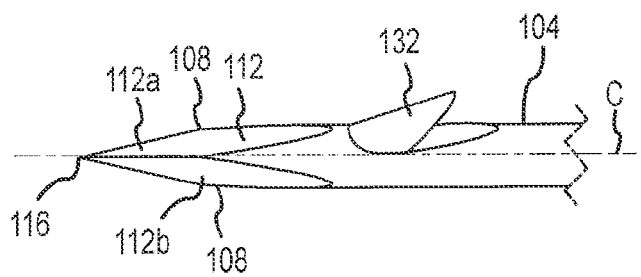
FIG. 14 is a view taken along a line corresponding to the intersection between two adjacent facets of a fish hook with multiple convex facets in accordance with other embodiments of the present invention.
Figure 15:
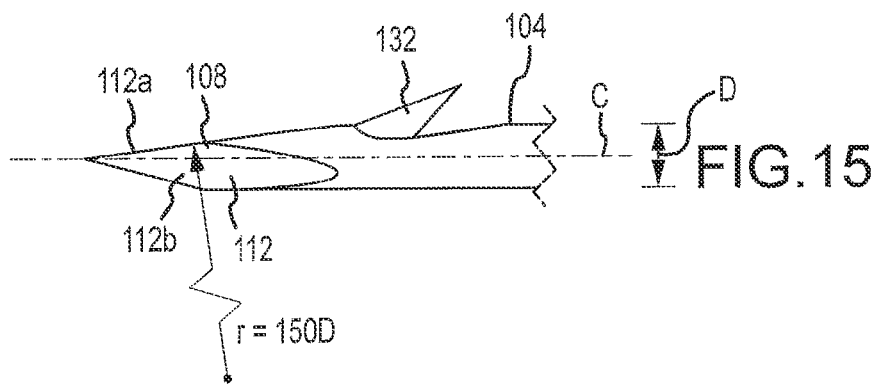
FIG. 15 is a side view of a point portion of a fish hook with multiple convex facets in accordance with other embodiments of the present invention.

FIGS. 13, 14 and 15 illustrate a view of the point portion 108 and barb 132 of a fish hook 104 in accordance with other embodiments of the present invention. More particularly, FIG. 13 illustrates the point portion 108 of a fish hook 104 in top plan view, FIG. 14 illustrates the point portion 108 of the fish hook 104 shown in FIG. 13, with the point portion 108 of the fish hook 104 rotated about 60° about a center axis C of the point portion 108 as compared to the view shown in FIG. 13, and FIG. 15 illustrates the point portion 108 of the fish hook 104 shown in FIGS. 13 and 14 in side elevation. In general, the convex facets 112 of the embodiment illustrate in FIGS. 13-15 are described by a larger radius of curvature than the convex facets 112 of the embodiment illustrated in FIGS. 2-4. For example, while the radius of curvature r of the facets 112 of the hook 104 depicted in FIGS. 2-4 are shown with a radius of curvature of about 40 times the diameter D of the wire body 120, the convex facets 112 of the fish hook 104 depicted in FIGS. 13-15 have a radius of curvature r of about 150 times the diameter D of the wire body 120.

Although a barb 132 has been illustrated as part of a fish hook 104, it should be appreciated that a barb 132 is not required. Accordingly, a point with multiple convex facets 112 in accordance with embodiments of the present invention can be provided as part of a barbless fish hook 104. Alternatively, a point with multiple convex facets 112 in accordance with embodiments of the present invention can be provided with multiple barbs 132.

In various embodiments illustrated and described herein, the facets 112 are shown having equal sizes, radiuses of curvature and spacings. However, other embodiments can be provided with facets 112 of different sizes, radiuses of curvature and spacings. In accordance with embodiments of the present invention, a fish hook 104 with multiple facets is formed by grinding an end of a wire. Moreover, the wire may be of any diameter deemed suitable for a particular application of the hook 104 formed therefrom. In addition, although the body 120 has been described as comprising wire, other materials and/or forms of material can be provided with a multiple faceted point as part of a fish hook 104 in accordance with embodiments of the present invention. For example, a fish hook 104 with multiple convex facets 112 can be formed by molding a plastic or other material.

A fish hook 104 with multiple convex facets 112 in accordance with embodiments of the present invention can be defined using three parameters: wire diameter, point length L to wire diameter D ratio, and the ratio of the grind radius of the facets 112 to the wire diameter D, referred to herein as the radius of curvature of the facets 112. A fish hook 104 having multiple convex facets 112 as described herein can be formed using computer numeric control machining techniques. More particularly, by providing three axes of wire blank motion, facets 112 having a convex shape can be formed. In addition, although various radiuses of curvature have been provided as examples, embodiments of the present invention are not limited thereto. In particular, a fish hook 104 having a point portion 108 formed from multiple facets 112, where each facet is convex and therefore curves outwardly from a line drawn between the tip of the point and the starting point of the facet can be provided. Moreover, in addition to following a first radius of curvature, or following first and second radiuses of curvature, facets 112 can have three or more radiuses of curvature. In addition, the tip portion 904 can have a radius of curvature that is larger than the radius of curvature of the second portion 908 of a multiple radius faceted 112 fish hook 104.

In an exemplary configuration, a fish hook 104 featuring three convex facets 112 having a length that is 4.5 times the diameter of the body 120 and a radius of curvature that is 150 times the diameter of the body 120 is provided. For such an exemplary embodiment, at a distance of about 15 thousandths of an inch from the apex of the point, the amount of material in a cross-section at that location is about 2 times the amount of material provided in a conventional concave three facet point and as a result the strength of this exemplary embodiment is about twice that of the conventional faceted point. Other exemplary facet 112 length L to wire diameter D ratios include three to one and six to one. Other exemplary convex facet 112 curvatures include radius of curvature to wire diameter D ratios of 20 to 1, 25 to 1, 120 to 1, 140 to 1, and 160 to 1.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A fish hook, comprising:
   a body, the body including a point portion at a first end of the body, a line attachment portion, and a bend between the point portion and the line attachment portion;
   at least three facets formed at the first end of the body, wherein each of the facets includes a convex surface, and wherein the convex surface of each of the facets is convex with respect to a line extending from a tip of the point portion of the fish hook to an end of the respective facet opposite the point portion.

2. The fish hook of claim 1, wherein the body has a diameter, and wherein the convex surface of each facet has a radius of curvature from about 15 times to about 150 times the diameter.

3. The fish hook of claim 1, wherein the point portion includes exactly three facets.

4. The fish hook of claim 1, wherein the point portion includes four facets.

5. The fish hook of claim 1, wherein the body is bent to form the bend between the point portion the first end and a second end of the body.

6. The fish hook of claim 1, further comprising a barb.

7. The fish hook of claim 1, wherein each facet includes first and second convex surfaces.

8. The fish hook of claim 2, wherein a length of each facet is from about 2 times to about 6 times the wire diameter.

9. The fish hook of claim 5, wherein a shank portion, the bend, and the point portion are all formed from a single piece of wire.

10. The fish hook of claim 9, wherein the wire has a diameter, wherein the length of each convex surface of each facet is about 4.5 times the diameter of the wire, and wherein the convex surface of each facet has a radius of about 30 times the diameter of the wire.

11. The fish hook of claim 7, wherein the first convex surface has a first radius, and wherein the second convex surface has a second radius.

12. A fish hook, comprising:
a wire body, wherein the wire has a diameter;
a three faceted point portion at a first end of the wire, wherein each facet of the point portion has a curved surface that is convex, wherein the curved surface of each facet is curved outwardly from a line drawn between a tip of the point portion and an end of a respective facet opposite the tip of the point portion, wherein the curved surface of each facet has a radius that is from 15 to 160 times the diameter of the wire, and wherein each facet has a length that is from 2 to 6 times the diameter of the wire;
an eye at a second end of the wire;
a bend between the eye and the point portion;
a barb between the bend and the point portion.

13. The fish hook of claim 12, wherein the curved surface of each facet has a radius that is from 20 to 150 times the diameter of the wire.

14. The fish hook of claim 12, wherein the curved surface of each facet has a radius that is about 150 times the diameter of the wire.

15. The fish hook of claim 12, wherein the curved surface of each facet has a radius that is about 140 times the diameter of the wire.

16. The fish hook of claim 12, wherein the curved surface of each facet has a radius that is 150 times the diameter of the wire, and wherein each facet has a length of 4.5 times the diameter of the wire.

* * * * *